3,416,405
CYLINDER FOR PLASTIC INJECTION MOLDING MACHINES

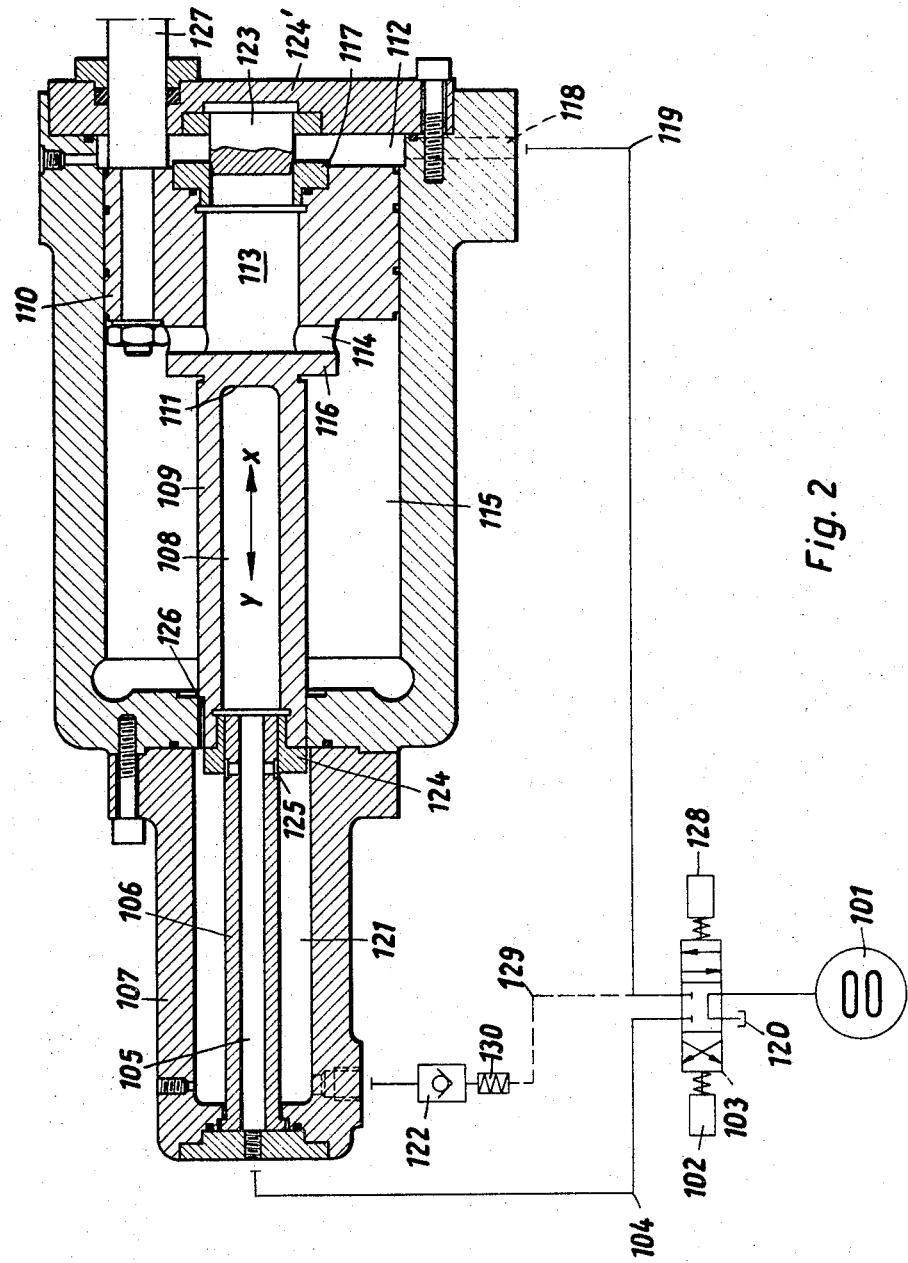

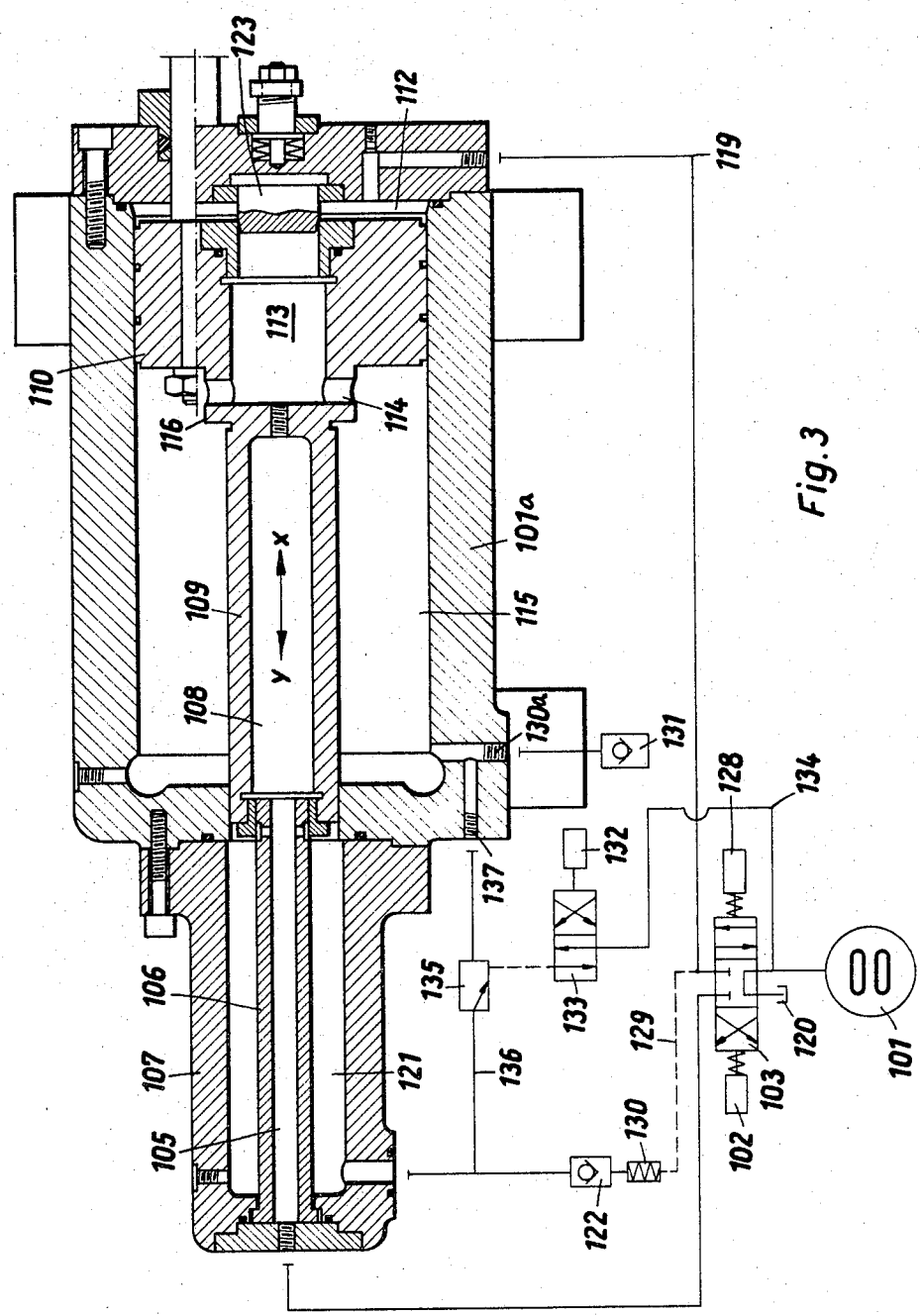

Hans-Joachim Langenohl, Ludenscheid, Westphalia, Germany, assignor to Fritz Sommer Nachf., Ludenscheid, Germany
Filed May 9, 1966, Ser. No. 548,651
17 Claims. (Cl. 91—25)

ABSTRACT OF THE DISCLOSURE

An arrangement for a plastic injection molding machine whereby a piston has high and low speed gradations during its operational strokes. The piston is displaceable in a cylinder through which a hollow closing sleeve extends into engagement with one side of the piston. A slow-stroke space is defined between the sleeve and cylinder and a guide cylinder is mounted externally on the cylinder. A tubular guide member is located in the guide cylinder and slidably supports the closing sleeve. Pressure is applied through the tubular member into the sleeve and into the guide cylinder axially against the sleeve as well as against the opposite side of the piston. The piston and closing sleeve can be fixedly or slidingly engaged.

---

The present invention relates to cylinders for plastic injection molding machines preferably of the type having automatic controls for the moving-out and moving-in speeds of the related piston rods, and of the type whose piston, can be put bilaterally under pressure and can be first moved-out quickly under low-pressure and subsequently more slowly under high-pressure, and can be moved-in with inverse speed gradation.

It is an object of the invention to be able to reverse the piston to slow-stroke at a specific distance from the closing position of the mold and thereby to move it with considerable pressure into closing position. Likewise, it is preferably possible to open the mold at low-speed under considerable pressure, until a clean separation of the molded articles is insured. Following a stroke insuring said effect, it is preferably possible to return the piston with high-speed at comparatively low-pressure. This arrangement is intended to bring about extensive protection of the molded articles and, upon opening, to insure that the workpieces are not chipped, torn or deformed, especially those workpieces which have little conicity.

The invention obtains the above objectives in that the closing piston is developed so as to be reversed from quick-stroke to slow-stroke and vice versa in accordance with a specific path of stroke.

According to another feature of the invention, it is expedient that the control valve formed by the closing piston be a slide valve which connects either two differential pressure chambers on the closing-side or the larger differential pressure space provided for the slow closing stroke and the return-side of the closing cylinder. This arrangement forms, with the return-side of the closing piston, three differential pressure surfaces, whose surface difference allows optimal control of the closing piston in response to appropriate pressure techniques.

A further development of the invention is provided in that the interior of a closing sleeve, which interior forms the smaller differential pressure space on the closing-side, can be put under pressure with pressure means with a view toward obtaining a quick closing stroke, said closing sleeve being axially guided in the cylinder cover on the closing-side and being displaceably positioned with its closed end in an axially limited manner in a pot-like recess or opening in the closing piston. The foregoing arrangement has the effect that the filling volume for the closing pressure depends exclusively on the dimensions of the interior of the tubular sleeve.

Another feature of the invention consists in that, during the quick closing stroke, the pressure-relieved return-side of the cylinder is connected, on the one hand, by way of a transfer port or duct in the closing piston, to the slow-stroke space on the closing-side and, on the other hand, by way of a conduit with a relief pressure valve, to a guide cylinder for the closing sleeve and to a reservoir or collecting container for the pressure means. This has the effect that the volume of the slow-stroke space, which volume increases due to the motion of the closing piston, is filled by the pressure means expelled from the return-side of the cylinder. In addition, the pressure means expelled from the return-side serves to fill immediately the volume becoming available in the guide cylinder as the closing sleeve is pushed out of said guide cylinder, whereby the pressure of the pressure means within said guide cylinder can be controlled or adjusted by setting the relief pressure valve. The excess pressure means is able to flow off from the return-side of the cylinder into a pressure means reservoir.

According to another feature of the invention, in the end position of the quick-stroke of the closing sleeve and of the closing piston, in case a settable excess pressure in the closing sleeve is exceeded, a control surface of the closing piston can be put under pressure with pressure means in closing direction, so that, after short axial control motion with respect to the closing sleeve, the transfer port in the closing piston between return-side and slow-stroke space is interrupted and, shortly thereafter, the supply of pressure means from the interior of the closing sleeve to the slow-stroke space is released with a view towards obtaining a slow closing stroke of the closing piston. The development of the closing piston as a slide valve, which development now becomes effective offers the advantage of extremely short transfer ports; this development avoids losses due to friction and throttles which always occur in the case of long conduits and insures an immediate response of the device to the hydraulic pressure changes which are provided.

Another development of the invention resides in the fact that, for the purpose of obtaining an initial slow return motion of the closing piston, during its relative return motion with respect to the closing sleeve effected by putting the return-side of the closing piston under pressure, the slow-stroke space on the closing-side is relieved from pressure by way of the interior of the closing sleeve. This relief, on the closing-side, both of the closing piston and of the closing sleeve operative in closing direction produces a high-pressure difference with respect to the closing-side of the cylinder put under pressure with pressure means; said pressure difference causes, at high operative forces, a slow return motion of the closing piston for opening the mold containing the injection-molded plastic article.

In contrast thereto, the invention further provides that the quick-return stroke is effected by closing the connecting port between the slow-stroke space and the interior of the closing sleeve and by the immediately following opening of the transfer port in the closing piston between the return-side of the cylinder put under pressure by the pressure means and the slow-stroke space. Thus, a comparatively small pressure difference between the return-side and the closing-side of the closing piston is obtained merely by the relative axial displacement of the closing piston with respect to the closing sleeve without the actuation of special valves, since the slow-stroke space is also under pressure by pressure means and only the interior of the closing sleeve is relieved from pressure.

According to another embodiment of the invention, it is provided that the closing piston with the closing sleeve is developed uniformly and that it releases or interrupts the pressurizing by pressure means of at least one additional piston surface on the closing-side upon being reversed to slow closing stroke or to quick opening stroke. The uniform development of closing piston and closing sleeve results in an extremely simple and, hence, economical construction of the cylinder which makes it possible, depending on the prevailing operating conditions, to put under pressure one or more differential piston surfaces of the piston surface on the closing-side at the start of the slow-stroke or to relieve the respective differential piston surfaces from pressure at the start of the quick opening stroke.

Another feature of the invention provides that the reversal from the quick to the slow closing stroke or from the slow to the quick opening stroke of the closing piston is effected by shutting or opening the transfer port designed for the passage of the pressure means in the closing piston and connecting the closing-side and return-side of the cylinder by a lug or such associated with the return-side of the cylinder. In this simple and effective manner, the circulation of the pressure means present in the cylinder space on the return-side to the closing-side of the cylinder is interrupted.

In order to increase the closing forces in the closing piston at the moment of closing the transfer port, another feature of the invention provides that at said moment at least one connecting port between the interior of the closing sleeve and the guide cylinder is opened by the closing sleeve with a view to additionally pressurizing the front face of the closing sleeve on the closing-side.

Another advantageous developement of the invention consists in that the surface of the closing piston on the return-side has slightly larger dimensions than the piston surface on the closing-side. This has the effect that the pressure means corresponding to the differential volume can be pressed into a reservoir during the closing stroke.

One embodiment of the invention is characterized in that the putting under pressure by the pressure means of two additional differential piston surfaces of the closing piston is released in closing direction approximately simultaneously upon closing the transfer port in the closing piston by its end on the closing-side. A further development of this idea may consist in that, upon the closing of the transfer port in the closing piston, there is provided, in addition to a radial aperture in the tubular member coaxially passing through the guide cylinder, by the closing sleeve, simultaneously a pressure-side connection of the closing-side of the cylinder with the guide cylinder.

In order to be able to put under pressure the slow-stroke space or the closing-side of the cylinder simultaneously with the front side of the closing sleeve, the arrangement according to another feature of the invention may be such that the cylindrical outer wall of the closing sleeve is cut, notched or indented at its end, which faces away from the closing piston and which is located in the plane of the cylinder cover on the return-side when the lug engages in the transfer port of the closing piston, at least on a part of the circumference and forms, opposite the passage opening in the cylinder bottom, a port or duct for the pressure means which is opened by a control edge of the closing sleeve moving over a control edge of the cylinder bottom when the same moves further in closing direction.

Another embodiment of the invention provides that, only in the end position of the closing stroke, the closing-side of the cylinder is connected, by the automatic reversal of a control valve, to the guide cylinder for the closing sleeve developed uniformly with the closing piston, with a view to supplying pressure by the pressure means. This embodiment is particularly suitable for larger machines or in the case of comparatively large closing pistons since, in this case, the simultaneous putting under pressure of the interior of the closing sleeve of its face on the closing-side and of the slow-stroke space of the cylinder would result in too slow an end closing motion, whereas the above-described pressurizing of the interior and of the closing-side face of the closing sleeve produces a quicker closing motion.

According to a further development of the invention it is expedient that the cylinder space on the closing-side, after reversal to the slow closing stroke, sucks pressure means from a reservoir due to diminished pressure by way of a suction valve and a bore in the wall of the cylinder.

This embodiment may also provide that there is connected into a control conduit leading to the control valve an operating or switching member by means of which the reversing of the control valve for the purpose of connecting the cylinder space to the guide cylinder is provided only after the transfer port in the closing piston has been released. This makes it possible to carry out the closing stroke comparatively quickly and to exert an increased closing pressure merely in its last end stage.

The invention is diagrammatically illustrated, by way of several embodiments, in the accompanying drawing, in which:

FIGURE 2 is a sectional view of another embodiment in the form of a quick-acting cylinder; and FIGURE 3 is a sectional view of still another embodiment in the form of a quick-acting cylinder.

Figure 1:
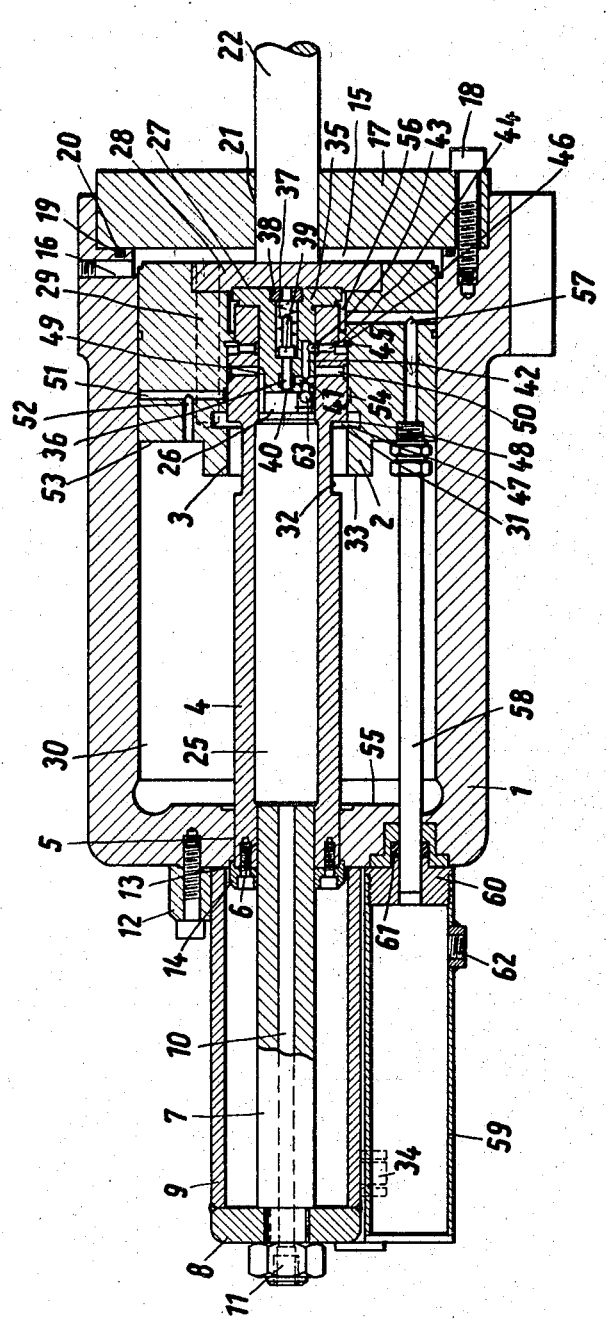
FIGURE 1 shows a first embodiment in the form of a quick-acting cylinder in longitudinal section.

Referring now to FIG. 1, element 1 is a quick-acting cylinder in which a closing piston 2 is longitudinally displaceable. A tubular sleeve 4 is limitedly and axially displaceable in a central, pot-shaped recess or opening 3 of the closing piston, said recess or opening being open on the closing-side. A second sliding sleeve or friction bearing 5 for the closing sleeve 4 is formed by an opening in the closing-side wall of the cylinder 1. The open end of the closing sleeve 4 has a longitudinal section 6 with reduced inside diameter by means of which the closing sleeve is slidingly guided on a tubular guide member 7. The tubular member is guided, with its end facing away from the quick-acting cylinder 1, through a cover 8 of a guide cylinder 9 for the closing sleeve 4 and is firmly screwed with respect to said cover. The outer opening of the longitudinal bore 10 of the tubular member is provided with a thread 11 for threadably attaching a connecting piece for a pressure means conduit. The other end of the guide cylinder 9 is screwed, by means of an annular flange 12, to the wall on the cover side of the quick-acting cylinder 1. The annular opening or recess in the front end 13 of the guide cylinder causes a buffer or cushioning effect upon engagement of the stop ring 14 at the end side.

A pressure means or return space 15 on the return-side of the quick-acting cylinder 1 is also connected to a conduit system for a pressure means by a connecting port 16 in the cylinder wall. The cylinder space 15 is closed by a cover 17 which is firmly but releasably screwed to the cylinder 1 by fitted bolts or screws 18. An annular packing 19 in an annular groove 20 in the face or front side of the cylinder seals same with respect to the cover. A piston rod 22 connected to one half of the plastic injection mold protrudes through a center bore 21, the return-side end of said piston rod 22 being connected to the closing piston 2.

The closing piston 2 is developed as control valve for the reversal from its quick closing stroke part to its slow closing stroke part and from its slow return stroke part to its quick-return part. In the present embodiment, the closing piston 2 and the closing sleeve 4 cooperatively form a slide valve which connects either two differential pressure spaces on the closing-side or the larger differential pressure space provided for the slow closing stroke and the return side 15 of the closing cylinder. The interior 25 of the closing sleeve, which forms the smaller differential pressure space on the closing-side, and the inner bottom 26 thereof can be put under pressure by a pressure means through the longitudinal bore 10 of the tubular member 7 to bring about a quick closing stroke. By abutment of the closing-side bottom surface 27 of the closing sleeve against the return-side closing plate 28 of the closing piston 2, which plate is firmly and tightly screwed to said piston, the closing piston 2 is moved simultaneously in closing direction. The pressure means in the pressure-relieved cylinder space 15 on the return-side is able to pass through a transfer port 29 in the closing piston 2 into large differential or slow-stroke space 30. The closing-side opening of the transfer port is located in the region of a radially inwardly opening annular groove 31 of the closing piston 2. During the above-described quick closing motion of the closing piston, whose end stroke position is illustrated in the drawing, the closing-side half of said annular groove 31 in the closing piston is approximately covered by the closing sleeve 4. Located opposite the remaining half of said annular groove and opposite that inner end section of the pot-like opening 3 which faces the slow-stroke space 30 is a neck 32 which is formed by reduction of the outside diameter of the closing sleeve 4 and which is extended beyond the stop surface 33 of the closing piston 2 facing the slow-stroke 30 and which, together with the inner face of the closing piston 2 opposite the neck, constitutes an extension of the transfer port 29. In addition, the return-side cylinder space 15 is connected, by way of the connecting port 16, and a pressure relief valve inserted into the pressure means conduit (not shown) is connected, by way of a lateral opening 34, to the interior of the guide cylinder 9 so that the volume made available by the closing sleeve 4 in the guide cylinder during the feed motion can be filled with pressure means. In addition thereto, the return-side pressure space 15 is connected to a pressure means reservoir adapted to receive the excess pressure means.

The quick closing stroke of the closing sleeve 4 and of the closing piston 2 taken along by said sleeve is limited by the impingement of the stop ring 14 on the wall of the cylinder 1 on the closing-side. There now occurs an increase in pressure in the interior 25 of the closing sleeve, until a pressure relief valve 36 provided in the bottom 35 of the closing sleeve 4 responds. Said pressure relief valve is developed as a sleeve or slide valve, whose closing spring can be set at a specific closing pressure by a screw 38 which, together with a plate-shaped or dish-shaped widening 39 of the slide piston, serves as supporting surface for the helical spring 37. Upon the pressure relief valve 36 being opened, the pressure means passes from the interior 25 of the closing sleeve 4 first into an axial port 40 and, subsequently, into radial port 41 in the bottom 35 and, then, into a port 42 parallel to said axial port 40, whereupon it flows through a radial port 43 in the bottom 35 through a radial port 44 of the closing sleeve 4, said radial port 44 being in alignment with the radial port 43. Located at the end of said port 44 is an annular space 45 which is limited in closing direction by an annular shoulder or control surface 46 of the closing piston 2. The putting under pressure of said control surface 46 with pressure means causes the start of the control motion of the closing piston to the effect of bringing about a change to the slow-stroke. Owing to the control motion of the closing piston 2 in the direction of closing, the pressure means in the cylinder space 15 on the return-side is still able to flow into the slow-stroke space 30 until the closing-side annular shoulder 47 of the annular groove 31 in the closing piston moves over the closing-side axial transverse shoulder 48 of the neck 32 in the closing sleeve 4. After a very small additional axial motion of the closing piston 2 with respect to te closing sleeve 4 which remain in its position, the pressure means now flows from the interior 25 of the closing sleeve through a bottom port 49 and a radial port 50 of the closing sleeve into a transverse port 51, from which a port 52 branches off, which is parallel to the longitudinal direction of the cylinder 1 and which conducts the pressure means to the slow-stroke space 30. This causes the closing-side annular surface 53 of the closing piston, which is partly formed by the stop surface 33, to be put under pressure, so that the closing piston is slowly moved under considable pressure in closing direction, until the injection mold is closed, and is thereafter maintained under said pressure.

The pressure means thereby also communicates with the radial port 51 of the closing piston and with the slow-stroke space 30 by way of the radial port 41 in the bottom 35 of the sleeve and the radial port 50 in the sleeve body itself and an annular groove 54 in the closing piston, which annular groove 54 communicates with said radial duct 50 owing to the control motion of the closing piston.

Since it is desirable to open the injection mold after the injection-molding process slowly but with considerable force, the supply of pressure means is switched to the return-side cylinder space 15 by a multiway valve (not shown) for obtaining an initially slow return motion of the closing piston 2, and the pressure means conduit leading to the closing-side of the cylinder is relieved from pressure. At the start of the putting under pressure of the closing piston 2 on the return-side, the slow-stroke space 30 communicates with the interior 25 by way of the ports 49, 50, 51, and 52. This communication is separated as soon as the closing piston 2, upon its control motion in return direction, is moved back with respect to the closing sleeve 4 (remaining in its position) to such an extent that the ports 50 and 51 are no longer in alignment. Only a short time thereafter, the closing-side annular shoulder 47 of the groove 31 of the closing piston 2 moves over the axial transverse shoulder 48 of the neck 32 of the closing sleeve 4 and thereby releases the transfer port 29. Since the slow-stroke space 30 is now put under pressure with pressure means by the cylinder space 15 on the return-side, the pressure difference between the pressures acting on the closing piston from the return-side and from the closing-side is comparatively small, so that the closing piston is now forced back in return direction with great speed, while taking along the closing sleeve 4. This results in a certain throttling effect by the pressure means which is present in the guide cylinder 9 and which is pressed out through the opening 34 by the return motion of the closing sleeve 4. The quick-return motion is limited by the impingement of the stop surface 33 of the closing piston on a corresponding stop surface 55 on the inside of the cylinder wall on the closing-side.

During the control motion of the closing piston relatively to the closing sleeve 4 from the slow to the quick-return stroke, leakage oil which has penetrated into a cup-shaped space 56 by way of the pressure relief valve 36 is pressed out by a partly radial and partly axial port 57 as well as a pipe 58, whose end on the closing-side opens into an overflow container 59. The closing-side end of the pipe is longitudinally displaceable in an extension piece 60 and is sealed with respect to the latter by means of a packing 61. The pressure means return from the overflow container 62 into the pressure means system.

The pressure means, which is under pressure in the annular space 45 during the return motion of the closing piston 2, is forced back into the pressure-relieved interior 25 of the closing sleeve 4 by way of the radial port 44 and the axial port 42 and a ball valve 63, after the pressure relief valve 36 is closed during pressure relief of the closing-side of the cylinder and simultaneously pressure load of the return-side of the cylinder.

According to FIG. 2, a pump 101 delivers for the purpose of a closing-stroke motion after actuation of a magnet 102 and of an associated control of an operating slide 103, pressure means by way of a conduit 104 into a bore 105 of a fixed piston 106 which is arranged in a guide cylinder 107 coaxially with the axis thereof.

The pressure means passes through the bore 105 of the piston 106 into an interior space 108 of a closing sleeve 109 which is developed as a unit with a closing piston 110 and which is closed by a bottom 111 at its front end, when seen in the direction of closing.

Owing to the small surface of the bottom 111, the closing piston 110 is moved in the closing direction of the arrow $x$ with comparatively high speed. During said closing motion of the closing piston 110, the pressure means which is present in the return-side 112 of the cylinder is circulated through a transfer port 113, 114 in the closing piston toward the closing-side 115 of the cylinder.

Whereas the member 113 of the transfer port is arranged coaxially with the quick-acting cylinder and has a large diameter, the member 114 of the transfer port consists of two or more radial ports in a shoulder 116 projecting in opening direction $y$ and having a smaller diameter. The return-side opening of the transfer port 113 comprises an annular fitting piece 117, whose inside diameter is somewhat smaller than the transfer port 113 over its remaining length. The return-side surface of the closing piston 10 is somewhat larger than the piston surface that can be put under pressure from the closing-side, so that the amount of pressure means corresponding to the differential volume is pressed through a bore 118 of the cylinder, by way of a conduit 119 and the operating slide 103, into a reservoir 120.

During the quick closing motion, the closing sleeve 109 sucks pressure means from the reservoir 120 into an annular cylinder space of the guide cylinder 107 by way of a suction valve 122, so that the cylinder space 121 is filled. As soon as the closing piston 109, 110 has reached the position shown in the drawing, a lug or shoulder 123 sealingly engages in the closing-side opening of the transfer port 113 (the lug or shoulder 123 being firmly but releasably connected to a cover 124' of the cylinder).

Shortly before the closing-side edge of the annular fitting piece 117 moves over the front edge of said lug or shoulder, a socket or collar 124, which is inserted into the closing-side end of the closing sleeve 109 and serves as sliding guide on the fixed piston 106, releases radial openings 125 of the piston. This allows the pressure means to penetrate into the cylinder space 121. Since a port 126 between the closing sleeve and the closing-side bottom of the cylinder is released by the closing sleeve 109 at approximately the same time, the pressure means is able to penetrate into the closing side 115 of the quick-acting cylinder and to put under pressure the annular differential piston surface of the closing piston 110 in the direction of closing.

The port 126 is formed by a groove cut into the outer surface area of the closing sleeve at the closing-side end thereof. The length of said groove, when seen from the closing-side end of the sleeve, corresponds approximately to the thickness of the cylinder bottom. Due to the fact that the cylinder space 121 of the guide cylinder 107 is put under pressure with pressure means, the suction pressure is counteracted, so that the suction valve 122 closes. The moving of the closing piston 110 onto the piston-like lug or shoulder 123 takes place at a comparatively small distance from the cylinder cover, for example, 20 mm., before the injection-molding tool is closed, thereby insuring the desired slow and careful moving-together of the tool halves by way of a piston rod 127 which is connected to one half of the plastic injection mold and is guided through the cover 124.

When the mold is to be opened, the pump 101 delivers the pressure means, by actuation of a magnet 128, through the bore 118 into the return-side 112. Until the reversing point, i.e., until the change from the slow to the quick stroke motion after an opening path of, for example, 20 mm., a desired high opening force at slow opening speed is obtained by putting under pressure the large surface of the closing piston 110. During the slow opening stroke, the cylinder space 115, the interior 108 of the closing sleeve 109 as well as the cylinder space 121 of the guide cylinder 107 are relieved from pressure, thereby enabling the pressure means to flow back into the reservoir 20 by way of the operating slide 103. As soon as the closing-side edge of the annular fitting piece 117 in the closing piston 110 separates from the piston-like lug, shoulder or protrusion 123 and is thereby switched to quick opening motion, the return-side 112 of the cylinder is again connected to the closing-side 115 of the cylinder by way of the transfer port 113, 114, while the closing side 115 is shut off with respect to the cylinder space 121 of the guide cylinder 107 and the cylinder space 121 is shut off with respect to the interior 108 of the closing sleeve 109. Since the difference of the surfaces of the closing piston on the closing-side and on the return-side is very small, an opening motion with comparatively high speed at low opening pressure is obtained. Since the conduit 119 is connected to the suction valve by way of a conduit 129, an opening cylinder 130 being arranged ahead of the suction valve, the suction valve 122 is opened at the beginning of the slow low-pressure opening stroke and during the quick opening motion in view of the required high opening pressure. The pressure means is thus able to flow out of the cylinder space 121 of the guide cylinder 107 and, by way of the suction valve 122, to the reservoir 120.

Referring now to the embodiment of FIG. 3, it is to be noted that the mode of operation for the quick-closing and opening stroke motions is the same in both embodiments of the invention. A change of the mode of operation of the quick-acting cylinder according to FIGS. 2 and 3 occurs only upon passing from the quick to the slow closing motion. Whereas in the quick-acting cylinder according to FIG. 2, the interior 108 of the closing sleeve 109, the cylinder space 121 of the guide cylinder 107, and the closing-side slow-stroke space 115 of the quick-acting cylinder are under pressure of the pressure means at the reversing point, only the interior 108 of the closing sleeve 109 is connected to the cylinder space 121 of the guide cylinder 107 in the quick-acting cylinder according to FIG. 3, in which the same members have the same reference numerals. After the engagement of the piston-like lug or shoulder 123 owing to the vacuum (or diminished pressure) that has been brought about, the closing piston 110 sucks pressure means from the reservoir 120 by way of a bore 130 in the cylinder 101a and a suction valve 131. When the tool is closed completely, a magnet 132 is actuated, which acts on an operating slide valve 133 which is connected to a pressure means conduit 134. The pressure means conduit is inserted in the main pressure means conduit between the pump 101 and the operating slide 103. The reversal of the operating slide 133 by the magnet 132 causes a valve 135 to be reversed, which is connected to a connecting conduit 136. The latter is, on the one hand, connected to the conduit between the suction valve 122 and the guide cylinder 107 and is, on the other hand, connected to the closing-side slow-stroke space 115 by way of a bore 137 and the bore 130a. The above mentioned reversal of the valve 135 causes a connection of the cylinder spaces 121 of the guide cylinder 107 and of the closing-side cylinder space 115. This has the effect that, at the end of the closing stroke, the entire closing surface of the closing piston is put under pressure, said closing surface being composed of the sum of the surface resulting from the pressure means spaces 108, 115 and 121.

During the opening of the quick-acting cylinder according to FIG. 3, the magnet 132 remains attracted until the reversal from the slow opening stroke to the quick opening stroke motion. Consequently, the pressure means is able to flow without pressure from the closing-side slow-stroke space 115 through the cylinder space 121 of the guide cylinder 107 and the interior 108 of the closing sleeve or through the bore 105 of the fixed piston 106 and through the operating slide 103 to the reservoir 120. The quick opening motion after the above-mentioned reversing point corresponds to the mode of operation described in connection with FIG. 2.

In the above description and by way of non-limitative example, the relative mobility of the closing sleeve 4 with respect to the piston 2 according to FIG. 1 can amount, for example, to about 25 mm. The following measurements are applicable by way of example to all embodiments according to FIGS. 1 to 3: The tubular guide member 7, 106 may have a diameter of about 60 mm. corresponding to a cross-sectional area of about 28.4 cm.$^2$ The closing sleeve 4 or 109 may have a diameter of 108 mm. corresponding to about 91 cm.$^2$ The return-stroke area can amount to about 650 cm.$^2$ The compression stroke area of the closing piston can amount to about 622 cm.$^2$ Thus the effective return area of the closing piston 2 or 110 can be about 28 cm.$^2$ greater than the compression stroke area of the closing piston. The entire area of the closing piston put under pressure during the compression stroke and the area put under pressure within the closing sleeve 4 or 109 (the latter area having the reference numeral 111 in FIG. 2) can amount to about 710 cm.$^2$ The maximal effective pressure can amount to about 200 atm. The speed of the closing piston during the quick-stroke can be about 450 mm./sec. The speed of the closing piston during the slow-stroke in the embodiment according to FIGS. 1 and 2 can amount to about 20 mm./sec. The speed of the closing piston according to FIG. 3 during the slow-stroke can amount to about 150 mm./sec. The path of the closing piston traveled during the quick-stroke can amount to 0 to 300 mm. The path traveled by the closing piston during the slow-stroke can amount to 0 to 20 mm. The diameter of the shoulder 123 can be about 80 mm.–50 cm.$^2$ The control surface 46 in FIG. 1 can amount to about 20 cm.$^2$.

There will now be obvious to those skilled in the art many variations of the structure set forth above. Such variations will not depart from the scope of the invention if defined by the following claims.

What is claimed is:

1. A control for a molding machine comprising a piston rod adapted for connection with said molding machine, a piston, a cylinder in which said piston is displaceable, and means cooperating with said cylinder and piston whereby the latter, and thereby said rod, can be given thrust and return strokes and whereby the piston is given a thrust stroke, along a determinable path, including an initial high-speed low-pressure stroke part and a subsequent low-speed high-pressure stroke part and whereby the piston is given a return stroke, along said path, including an initial low-speed high-pressure stroke part and a subsequent high-speed low-pressure stroke part; said means cooperating with said piston and cylinder to determine said stroke parts according to movement of said piston along said path, said means comprising a hollow closing sleeve extending through said cylinder at one side of and engaging said piston, said sleeve and cylinder defining a slow-stroke space therebetween, a guide cylinder on the first said cylinder, a tubular guide member in said guide cylinder and slidably supporting said closing sleeve, and a source of pressure medium, control means associated with said source to apply pressure through the tubular guide member to the interior of the said sleeve and, into the guide cylinder, axially against said sleeve for said thrust stroke, said control means and said source further supplying said pressure medium to said cylinder to apply pressure to the other side of said piston, said other side defining a return space with the first said cylinder wherein the latter said pressure is applied.

2. A control as claimed in claim 1 wherein said piston and closing sleeve are fixedly engaged.

3. A control as claimed in claim 1 wherein said piston and closing sleeve are slidably engaged.

4. A control as claimed in claim 3 wherein said piston and sleeve are provided with a duct system leading from said one side of the piston to said other side and which opens into said slow-stroke space, relative movement between said sleeve and piston selectively blocking and opening said duct system and selectively isolating and connecting said return space and slow-stroke space.

5. A control as claimed in claim 4 wherein said piston and sleeve are further provided with a second duct system leading from the interior of said sleeve to said slow-stroke space, relative movement between said sleeve and piston selectively blocking and opening said second system for selectively isolating and connecting said slow-stroke space with the interior of said sleeve.

6. A control as claimed in claim 5 wherein said piston is provided with an opening to receive said sleeve and includes a plug in said recess on which said sleeve is slidably received, said piston including a control surface portion, said plug including an adjustable relief valve opening laterally therefrom and also opening into the interior of said sleeve to be controlled by pressure in the latter, said sleeve including a duct adapted, at a determinable relative positioning between said plug and sleeve, to couple said valve for the transfer of pressure against said control surface portion.

7. A control as claimed in claim 6 comprising an overflow container and a duct system leading from the vicinity of said control surface portion to said container.

8. A control as claimed in claim 7 comprising a ball valve in said plug for bypassing said relief valve between said control surface portion and the interior of said sleeve.

9. A control as claimed in claim 3 comprising a stop ring on said sleeve outside the first said cylinder to limit movement of said sleeve.

10. A control as claimed in claim 2 comprising a protrusion on and internally of the first said cylinder in the path of said piston, said piston being provided with an opening for the engaging of said protrusion.

11. A control as claimed in claim 10 comprising a shoulder on the piston and connected to said sleeve, said shoulder being provided with a radial port connecting said opening to said slow-stroke space.

12. A control as claimed in claim 11 comprising cooperating groove and shoulder means on the first said cylinder and on said sleeve to provide selective coupling between said slow-stroke space and said guide cylinder.

13. A control as claimed in claim 11, wherein said tubular guide member is provided with radial openings, comprising a collar on said sleeve and through which said guide member extends, said collar selectively obturating said radial openings.

14. A control as claimed in claim 11 comprising means for supplying a pressure medium directly into said slow-stroke space.

15. A control as claimed in claim 13 wherein said protrusion and piston are related such that when the protrusion engages the opening in the piston said radial openings are opened to subject the interiors of the guide member and sleeve to the pressure within the guide cylinder.

16. A control as claimed in claim 15 comprising a suction valve coupled to said guide cylinder.

17. A control as claimed in claim 12 wherein said one side of said piston has a smaller area than said other side.

References Cited

UNITED STATES PATENTS

| 3,104,591 | 9/1963 | Cudnohufsky | 91—37 |
| 3,118,348 | 1/1964 | Kline | 91—25 |
| 3,150,562 | 9/1964 | Allgeyer | 91—443 |
| 3,211,424 | 10/1965 | Lewakowski | 91—39 |
| 3,241,461 | 3/1966 | Drone | 91—436 |

MARTIN P. SCHWADRON, *Primary Examiner.*

FRANK SUSKO, *Assistant Examiner.*

U.S. Cl. X.R.

91—443, 444